United States Patent
Rao

[11] Patent Number: 6,042,747
[45] Date of Patent: Mar. 28, 2000

[54] METHOD OF PREPARING HIGH BRIGHTNESS, SMALL PARTICLE RED-EMITTING PHOSPHOR

[75] Inventor: Ravilisetty P. Rao, Highland, N.Y.

[73] Assignee: Matsushita Electric Industrial Co., Ltd., Kadoma Osaka, Japan

[21] Appl. No.: 09/012,169

[22] Filed: Jan. 22, 1998

[51] Int. Cl.$^7$ .......................... C09K 11/63; C09K 11/77
[52] U.S. Cl. ...................................... 252/301.4 R
[58] Field of Search ...................... 252/301.4 R

[56] References Cited

U.S. PATENT DOCUMENTS

| | | | |
|---|---|---|---|
| 4,202,794 | 5/1980 | Lehmann | 252/301.4 R |
| 5,776,368 | 7/1998 | Chau | 252/301.4 R |

FOREIGN PATENT DOCUMENTS

| | | | |
|---|---|---|---|
| 59-15.951 | 4/1984 | Japan | 252/301.4 R |
| WO 97/26312 | 7/1997 | WIPO . | |

OTHER PUBLICATIONS

M. Kotaisamy et al.; On the Formation of Flux Grown $Y_2O_2S:Eu^{3+}$ Red Phosphor; J. Electrochem. Soc., 142 3205, Sep. 1995.

R.P. Rao; Preparation and Characterization of Fine-Grain Yttrium-Based Phosphors by Sol-Gel Process; J. Electrochem. Soc., 143 189, Jan. 1996.

T.R.N. Kutty et al.; Luminescence of Eu2+ In Stronium Aluminates Prepared by the Hydro-thermal Method; Mat. Res. Bull., 25 (1990) 1355.

*Primary Examiner*—C. Melissa Koslow
*Attorney, Agent, or Firm*—Ohlandt, Greeley, Ruggiero & Perle

[57] ABSTRACT

Improved yttrium, gadolinium borate phosphor particles are produced by thermal decomposition of gels/solutions comprising yttrium, gadolinium and europium salts in the form of gels or solutions and an organic precursor such as trimethyl borate at a temperature well below the normal temperature of solid state reaction. The phosphor of the present invention has the empirical formula:

$$(Y_{1-x-y-z}Eu_xGd_yM_z)BO_3$$

wherein: $0.01 \leq x \leq 0.1$, $0 \leq y \leq 0.5$, M=Mg, Ca, Sr or Ba and $0 \leq z \leq 0.1$.

20 Claims, 7 Drawing Sheets

METHOD OF PREPARING HIGH BRIGHTNESS, SMALL PARTICLE RED-EMITTING PHOSPHOR

FIELD OF THE INVENTION

This invention relates to improved yttrium gadolinium borate phosphor particles activated with europium and a method for forming such particles. More specifically, the invention relates to an improved method of forming such particles from nitrates and organic precursors, which form small phosphor particles that provide improved performance (higher brightness) required for use in flat panel display (FPD) applications.

BACKGROUND OF THE INVENTION

Europium activated yttrium, gadolinium borate ((Y, Gd)BO$_3$:Eu$^{3+}$) is an efficient red emitting photo- and cathodo-luminescent phosphor. In recent years, efforts have been made to develop this phosphor, which is currently used in plasma display panels (PDP) due to its high quantum efficiency, persistence characteristics and reduced saturation.

These phosphors have been conventionally prepared by a high temperature (>1200° C.) solid state reaction (SSR) between Y$_2$O$_3$ (Y source), Gd$_2$O$_3$(Gd source), Eu$_2$O$_3$ (Eu source), boric acid and NH$_4$F or NH$_4$Cl (flux). The grain size of phosphor powders prepared by SSR is on the order 5 to 10 microns. Flat panel display devices such as PDPs, field emission displays (FED), and electro-luminescence (EL) panels, require thin fluorescent screens with fine grain (0.1 to 2 microns) phosphors for better performance and high efficiency. This requirement is more demanding in the case of PDPs, as the phosphors are screen printed between complicated structures, such as ribs. With small particles, it is possible to form a thin screen. Small particles also allow for a higher packing density and less binder content.

Originally, phosphors having a small particle size were obtained by grinding, crushing or milling large phosphor particles. Phosphors obtained by these methods showed greatly reduced efficiency, with little or no control over the particle morphology. More recently, "no mill" phosphors have been prepared by rapid cooling of a phosphor mass after completion of the SSR and with either a short-time firing at a high temperature, or a longer duration firing at a lower temperature. These processes help minimize further growth of phosphor crystals. In the presence of flux or inhibitors, particle size distribution (PSD) and morphology of the phosphor can be controlled. See M. Kotaisamy, R. Jagannthan, R. P. Rao, M. Avudaithai, L. K. Srinivassan and V. S. Sundaram, J. Electrochem Soc. 142 (1995) 3205. It has been proposed that sub-micron size phosphor particles can be synthesized by a sol-gel process. See R. P. Rao, J. Electrochem Soc. 143 (1996) 189. Small phosphor particles have been synthesized by hydrothermal methods. See T. R. N. Kutty, R Jagannthan, R. P. Rao, Mater. Res. Bull. 25 (1990) 1355.

Most past work on red phosphors has been related to Eu$^{3+}$ activated yttrium oxide for fluorescent lamps and yttrium oxy-sulfide for cathode ray tubes at(CRTs). Since neither of these phosphors are suitable for alternating current PCPs or (AC PDPs), attempts have been made to develop new phosphors useful in PDPs that are excitable at wavelengths generated by Xenon gas (147 and 173 nm). Eu$^{3+}$ activated borates of yttrium and lanthanum series are proposed in the literature, however, limited information is available on the preparation and luminescence of europium activated yttrium gadolinium borate phosphors. U.S. Pat. No. 4,202,794 to Lehmann proposes an improved phosphor composition expressed by the general formulation xCaO.y(Y+Eu)$_2$.zB$_2$O$_3$ wherein x is from 32 to 38, y is from 31 to 40 and z is from 25 to 31. Such phosphors are alleged to provide a higher photoluminescence efficiency compared to a similar type of phosphor, when excited by 254 nm radiation and emitting in the red region of the visible spectrum.

Since past synthesis methods involved high temperature solid state reactions, the control over the impurity concentration, PSD and morphology was limited. Also, it has been found that the phosphor screens formed with small particles (0.5 to 2.0 microns) exhibit improved performance. This is particularly true for PDPs. However, most of the above methods fail to provide small particles (0.1 to 2.0 microns). The growth of small particles can be possible in case of sol-gel or solution methods where the reaction temperatures are well below the normal solid state temperatures.

SUMMARY OF THE INVENTION

Accordingly, it is an object of the present invention to provide a Eu$^{3+}$ activated yttrium, gadolinium (alkaline earth) borate phosphor having the empirical formula:

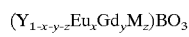

$$(Y_{1-x-y-z}Eu_xGd_yM_z)BO_3$$

wherein: 0.01≦x≦0.1; 0≦y<0.5; M=Mg, Ca, Sr, or Ba; and 0≦z≦0.1, which method provides the phosphor in the form of a powder having a small particle size which displays improved brightness.

The fine grain phosphors of the present invention are synthesized by a sol-gel process. The sols are dispersions of colloidal particles in a liquid. The gravitational forces on the particles are negligible. From a sol, a gel is formed with an interconnected rigid network having sub-micrometer pores and a polymeric chain with an average length on the order of microns. The particle size of the finished product is a function of the initial concentration of colloidal particles in the starting sols, the gelation process, the manner in which the gels are dried, the calcination temperature, and the rate of cooling.

A sol-gel process offers many advantages over conventional methods in the synthesis of fine powders and particularly in the synthesis if fine phosphor powders. Since all of the starting materials are mixed at the molecular level in a solution, a high degree of homogeneity is achievable. Doping of impurities (activators/coactivators/sensitizers) through solutions is straightforward, easy and effective. The pores in properly dried gels are often extremely small and the components of a homogenous gel are intimately mixed. The surface area of powders produced from a sol-gel is very high, allowing for the use of lower processing temperatures.

Phosphor materials formed by the sol-gel process of the present invention have an improved morphology, and are well suited for use in paste formulations used in the fabrication of phosphor screens, such as pastes for screen printing and slurries. Further, due to the purity and small size of the phosphor particles formed using the sol-gel process, many post-processing steps, such as washing to remove flux and flux related materials, and grinding/milling needed to reduce the size of the phosphor particles, can be eliminated.

Phosphor materials are extremely sensitive to impurities, even in ppb levels. The low-temperature sol-gel synthesis process of the present invention minimizes the potential for cross contamination. Some of the unwanted impurities left in the materials from conventional methods may pose a threat to the performance of a phosphor. For example, fluoride from a flux ($MgF_2$) can attack the glass surface of the display during operation. As the size of the phosphor particle decreases, the probability of electron and hole capture due to the presence of impurities increases and the electron/hole localization enhances the recombination rate via the impurity. See R. N. Bhargave, D. Gallagher and T. Welker, J. Luminescene 60 (1994) 280. The optimum impurity concentration (activator) level can be further increased by small particle size. The present invention, which grows $Eu^{3+}$ activated yttrium, gadolinium and alkaline earth borate phosphor by sol-gel and solution processes provides materials that exhibit higher brightness and smaller particle size. The small particle size of phosphor particles formed using the methods of the present invention make them particularly suitable for use in applications in which a high packing density is required.

More specifically, the present invention provides a method for forming a $Eu^{3+}$ activated yttrium, gadolinium, (alkaline earth) borate phosphor having the empirical formula:

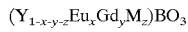
$(Y_{1-x-y-z}Eu_xGd_yM_z)BO_3$ wherein: $0.01 \leq x \leq 0.1$, $0 \leq y \leq 0.5$; M=Mg, Ca, Sr or Ba; and $0 \leq z \leq 0.1$ and wherein all the europium activator occupies available sites as $Eu^{3+}$. This method includes the steps of:

(1) reacting a dilute solution comprising a source of yttrium, a source of gadolinium, a source of alkaline earth element, a source of europium and an organic precursor providing a source of boron, in an acid medium to form a sol and/or a gel;

(2) thermally decomposing the sol and/or gel at a temperature below a solid state reaction temperature.

DETAILED DESCRIPTION OF THE INVENTION

Figure 1:
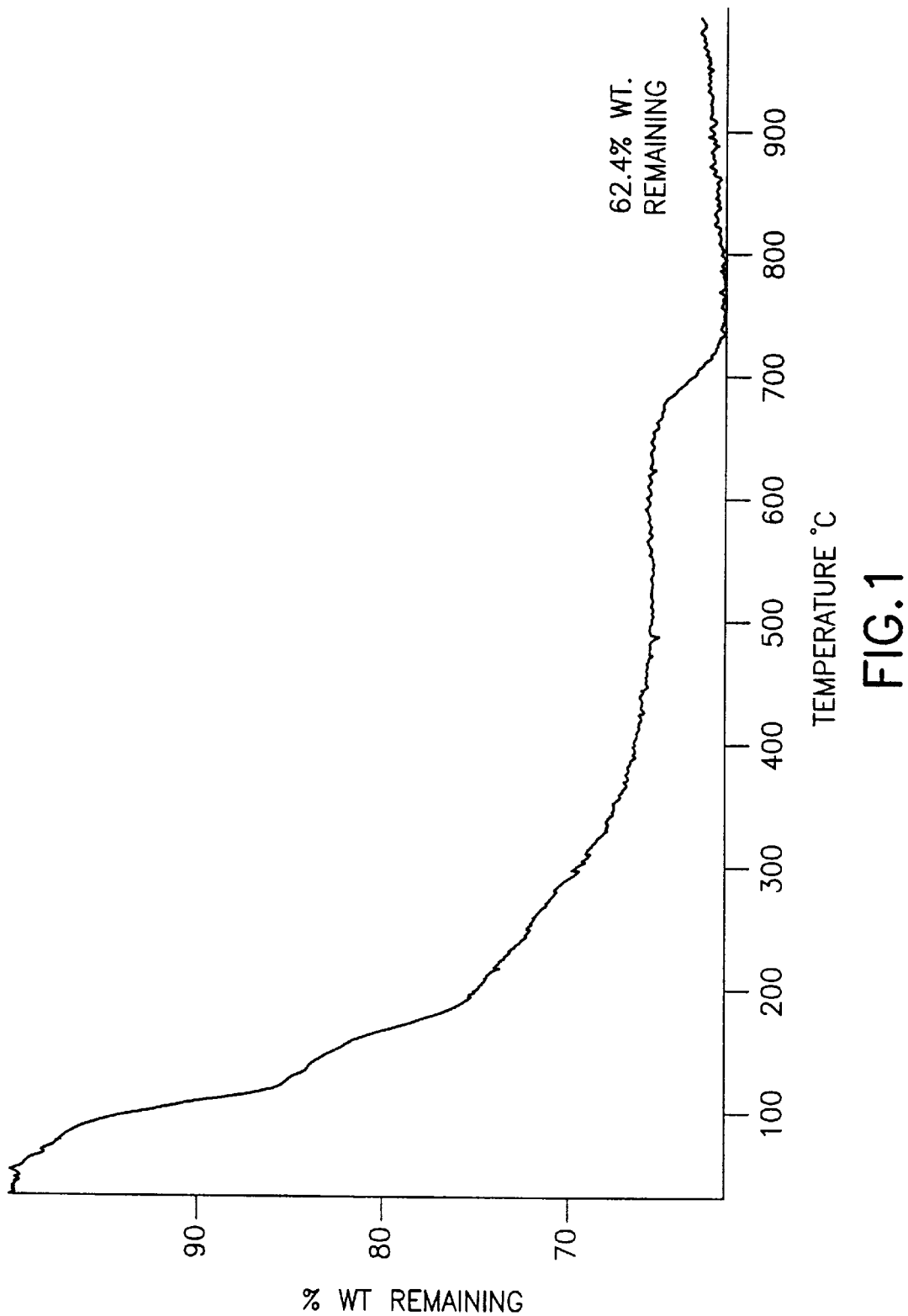
FIG. 1 provides a thermo-gravimetric analysis (TGA) of a rare earth (RE) borate xerogel powder.

There are a number of display applications where a red phosphor with high brightness, shorter persistence, higher color purity (saturation) and long life (time of operation) would significantly improve the display's performance. Since commercially available RE based phosphors fail to satisfy all the above requirements, a phosphor synthesis process that overcomes the above limitations was developed. The result of this development effort is the basis of the present invention.

The present invention provides a method of synthesizing yttrium, gadolinium borate phosphors incorporating high concentrations of activator ion ($Eu^{3+}$). The formation of yttrium, gadolinium solid solution critical to the phosphor depends primarily on the reaction temperature and conditions. In a solid state reaction, respective oxides are reacted at high temperatures in the presence of excess boric acid. At these temperatures other phases may form, such as individual borate's and unreacted oxides of yttrium, gadolinium, etc. Proper doping of impurity ions into the lattice of the complex is uncertain. Further, the use of a high temperature process leads to the growth of bigger particles.

The sol-gel process can be divided into two categories: (1) aqueous-based processes that starts from a solution of a metal salt; and (2) alcohol-based processes that starts from a metal alkoxide. The most suitable process is selected based primarily on the cost and availability of the starting chemicals. Since the purity of the starting chemicals is important to the synthesis of phosphors, the starting chemicals are of 0.9999 to 0.999999 purity. Because metal alkoxides are expensive, nitrates of yttrium, gadolinium, europium and alkaline earth are preferably selected as metal source. Trimethyl borate is preferred as a boron source. A suitable trimethyl borate stock solution is preferably prepared by mixing trimethyl borate and ethanol in a molar ratio of 1:10.

Metal precursors can be synthesized by the following reaction schemes:

(1) An alkoxide can be synthesized by adding metal (for example yttrium) acetate $(YOOCH_3)_3.xH_2O$ to 2-methoxyethanol ($OCH_3C_2H_5OH$). After refluxing at 125° C. for 12 hours, the clear solution turns to a slight greenish-yellow solution. These yttrium methoxy-ethoxide sols are stable for months at room temperature. Yttrium isopropoxide can also be prepared by mixing lithium isopropoxide in isopropyl alcohol with yttrium chloride in tetrahydrofuran. This solution requires subsequent filtration and purification to remove chloride and lithium ions from the product;

(2) A yttrium hydroxide precursor can be prepared by precipitating an aqueous solution of $YCl_3$ or $Y(NO_3)_3$ (0.01M) in water by adding a base (e.g., ammonium hydroxide) to the solution. A gelatinous precipitate with pH=10.0 to 10.4 is obtained. These gels are washed a number of times with DI water to remove counter ions ($NO_3^-$ or $NH_4^+$). Trace amounts of these ions have previously been found to cause the efficiency of the final product to deteriorate.

However, due to various difficulties in controlling the process, and the high price of the starting chemicals, neither method (1) nor method (2) provide an economical means for preparing bulk quantities of the phosphors of the present invention. In contrast to the foregoing methods, bulk quantities of the phosphors of the present invention can be prepared economically according to the following, representative reaction scheme:

(3) By using ion exchange resin, stable sol-gels are prepared. Yttrium nitrates of 0.999999 purity are dissolved in deionized (DI) water to obtain a clear 0.01M solution. This solution is passed through an ion $(OH)^-$ exchange column with Dowex 1X4 (50–100 mesh) resin at room temperature. The flow of the solution is controlled to maintain the pH of the collected solution at 11.0. A yttrium hydroxide sol collected at the bottom of the resin column is clear but will become opalescent with increases in yttrium concentration, as well as upon storage. Sols prepared at lower concentrations of yttrium are stable for months. Sols of other metal (Eu, Gd, and M) hydroxides can be similarly prepared.

The required metal solutions can also be prepared by mixing appropriate amounts of respective metal nitrates in a luke warm DI water to obtain 0.05 to 0.1M solutions. Stiochemtric quantities of metal (Y,Gd,Eu and M) solutions and trimethyl borate are added together in a manner such that the metal/borate ratio is constantly maintained in the range from about 0.95 to about 1.05. The metal/borate solution is transferred to a round bottom flask and gelation is conducted by peptizing at 80 to 100° C. for 12 to 18 hours in a stirrer mantle.

Gelation is preferably carried out with an acid catalyzed sol (pH=1.0 to 2.0). In low pH sols, it is believed that pepitization requires the addition of a suitable acid to the solution. Acid additions are generally specified in terms of acid type and pH. The type of acid is generally more important than the pH. Nitric acid and boric acid have been found to be particularly useful as peptizing agent s that lead to the formation of structurally homogeneous gel networks. The use of boric acid has been found particularly preferable as it acts as an acid catalyzer as well as a boron source. The loss of boron during the calcination is compensated for by the pressence of an excess of boric acid.

After pepitization, the sol/gel is left in a container (crystalizing dish) until it becomes a thick gel (3 to 5 days). The so-called gel is then dried in a lab oven at 50 to 60° C. until it becomes xerogel (powder). The xerogel, a transparent substance, is transferred into a high grade alumina crucible and subjected to two heat cycles. In first heat cycle, the sample is soaked for 2 hours at 100° C. and then heated to 800 to 1000° C. for 2 to 12 hours. After cooling to room temperature, the mass is crushed gently (e.g., in a mortar using a suitable pestal). The resulting crushed powder is then washed with deionized water and dried at 100° C. for 4 to 6 hours.

Thermal analysis of phosphor samples containing various proportions of metal provide insight into the reaction kinetics. The thermal analysis data of a RE borate xerogel sample is presented in FIG. 1. This data reveals that the sample has undergone two to three successive weight changes in to three different temperature regions. The first weight change occurs at around 100° C. and corresponds to the loss of free water molecules associated with respective metal salt solutions. The second weight loss, around 200 to 300° C., is due to the loss of —$OCH_3$ through thermally accelerated oxidation.

Figure 2:
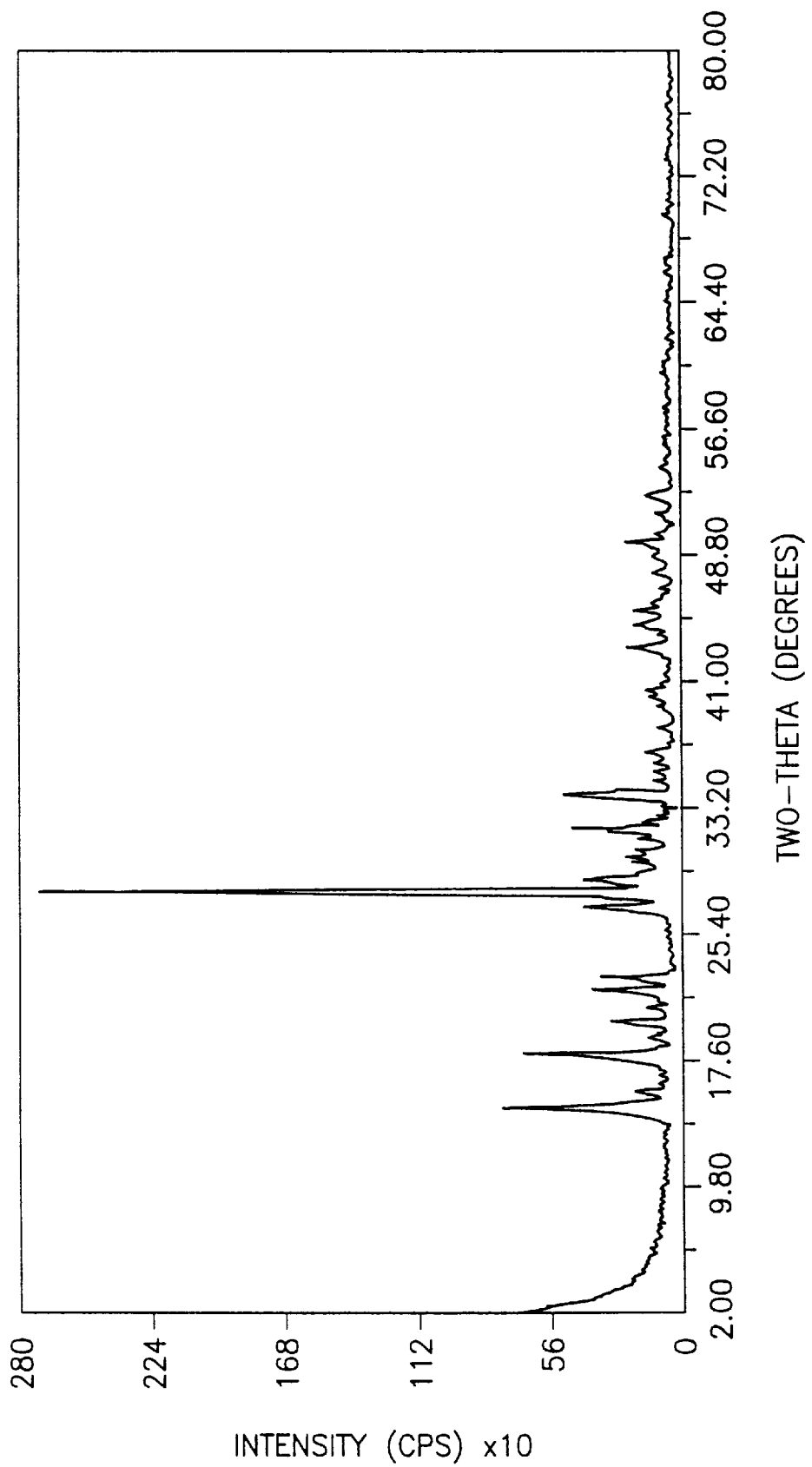
FIG. 2 shows X-ray diffraction (XRD) patterns of Eu activated Y,Gd borate phosphor prepared from RE nitrates.
Figure 3A:
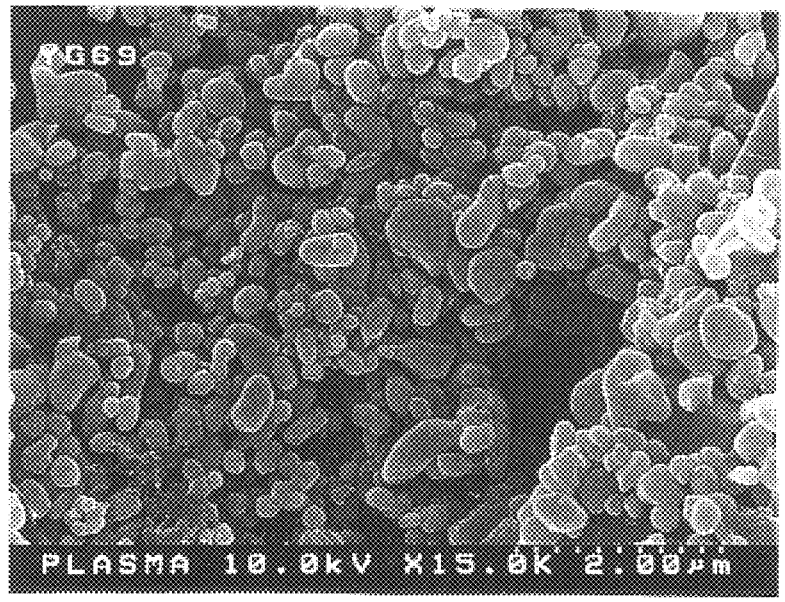
FIG. 3 illustrates scanning electron micrographs of Y,Gd borate phosphors prepared from (a) RE hydroxides after washing; (b) RE nitrates before washing; and (c) and (d) RE nitrates after washing.
Figure 3B:
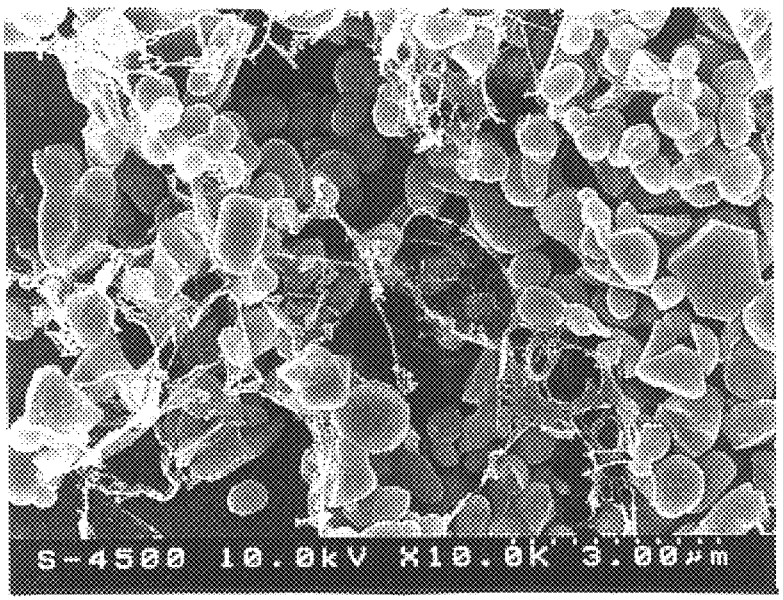
Figure 3C:
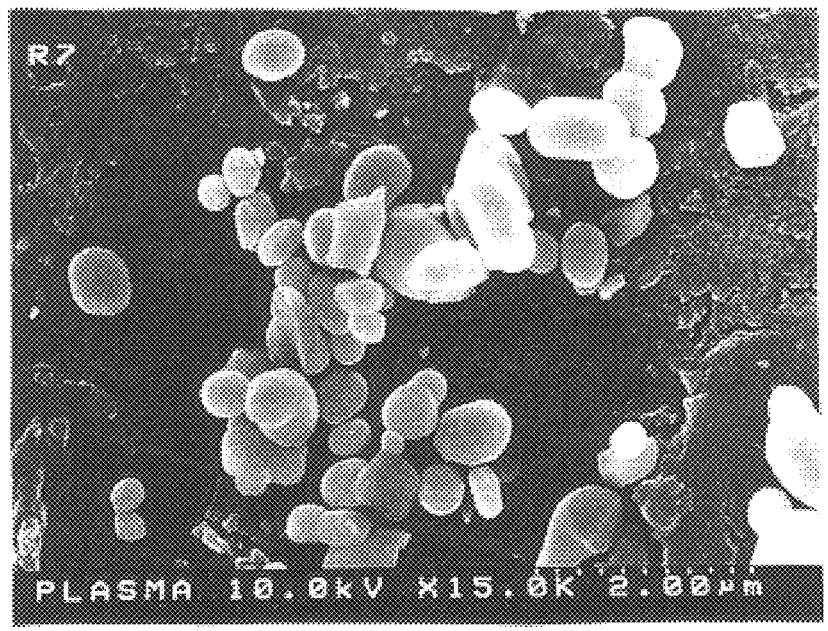
Figure 3D:
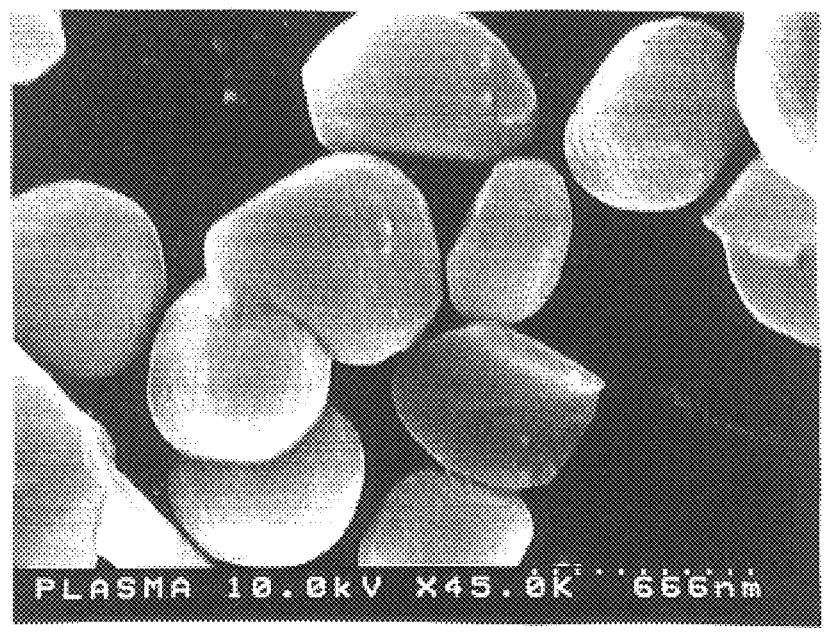

X-ray powder diffraction data on samples fired at 950° C. is shown in FIG. 2. Samples fired at 800° C. show some of the lines corresponding to the yttrium, gadolinium borate phase. Since there is no standard data on these new materials, XRD lines are compared with data on the starting materials as well as possible intermediate compositions, such as nitrates and oxides of the respective metals. All the prominent lines corresponding to yttrium, gadolinium borate phase are observed in samples fired above 850° C. This indicates that the samples are completely converted to borate as no lines corresponding to the metal nitrates and oxides are observed. This conclusion is also supported by TGA data. The lines corresponding to the metal borate phase are more prominent with increased firing temperatures.

Figure 4A:
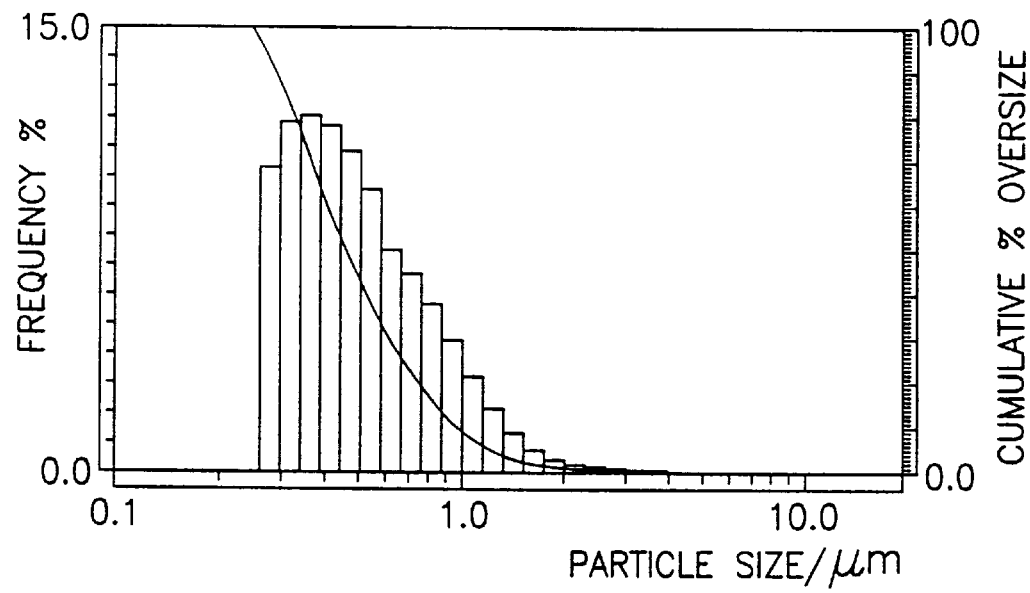
FIG. 4 graphs the particle size distribution of Y,Gd borate phosphors prepared from (a)RE hydroxides and (b) RE nitrates.
Figure 4B:
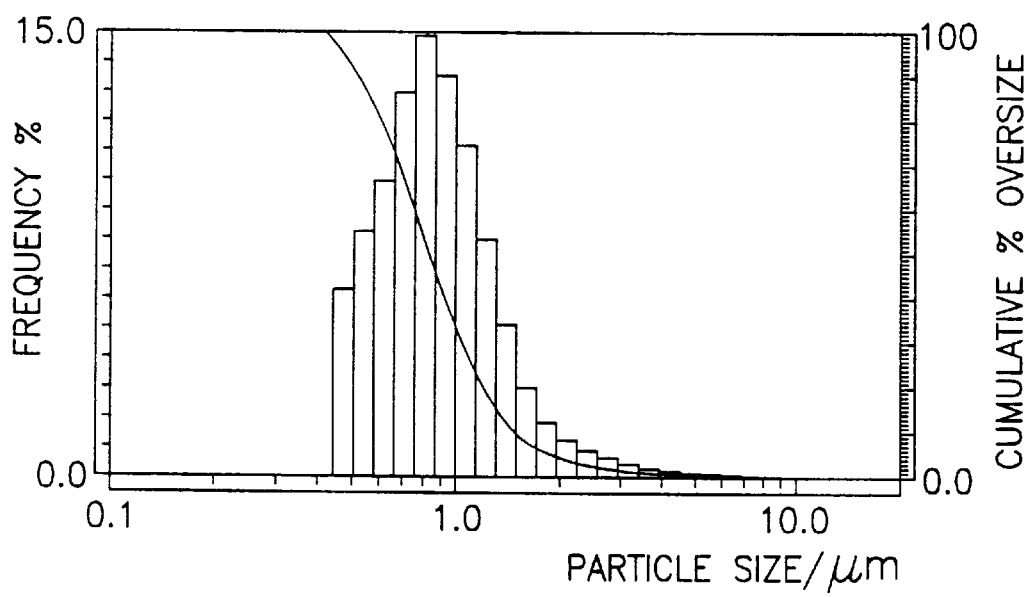

Since the luminescence of a phosphor depends on the shape, size, crystallinity, defects and grain boundaries, the morphology and PSD of all the samples prepared at various conditions were studied. Scanning electron micrographs of phosphor samples prepared at various conditions are shown in FIG. 3. From these micrographs one can observe that the phosphor particles are uniform and exhibit spherical shapes. The PSD of phosphors prepared at different temperatures are shown in FIG. 4(b). The samples are washed with water after calcination to eliminate very small particles (<0.05 microns) as well as organic residues and allowed to dry. The emission characteristics of these phosphors are measured with powders as well as coated screens, at room temperature.

Figure 5A:
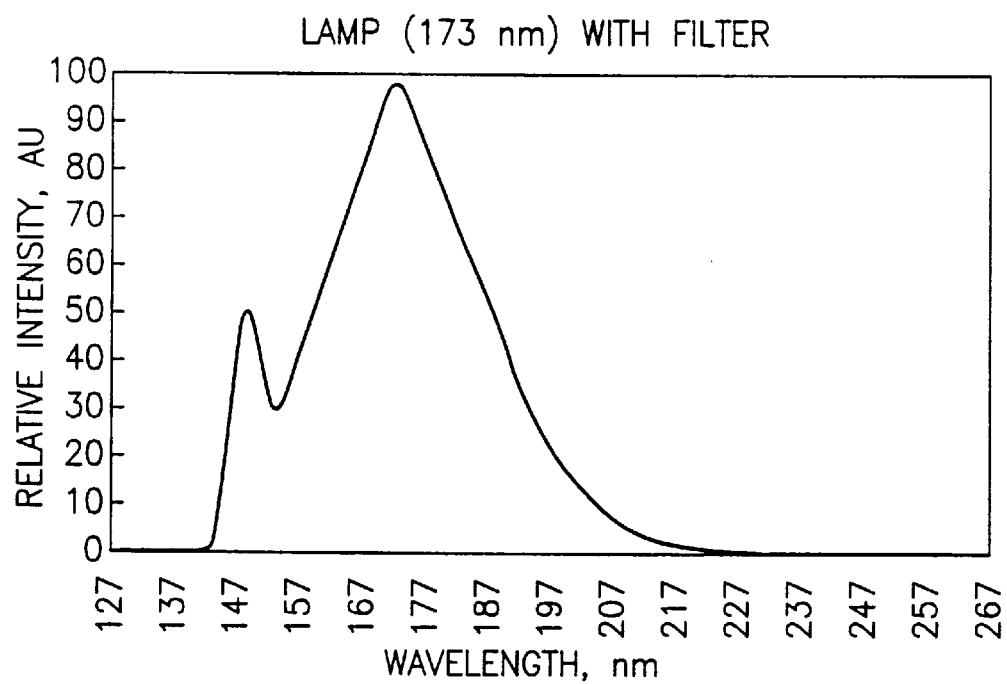
FIG. 5 provides the spectral distribution of radiation energy from Xe lamps at a) 147 nm and b) 173 nm wavelengths with $MgF_2$ windows and suitable band pass filters.
Figure 5B:
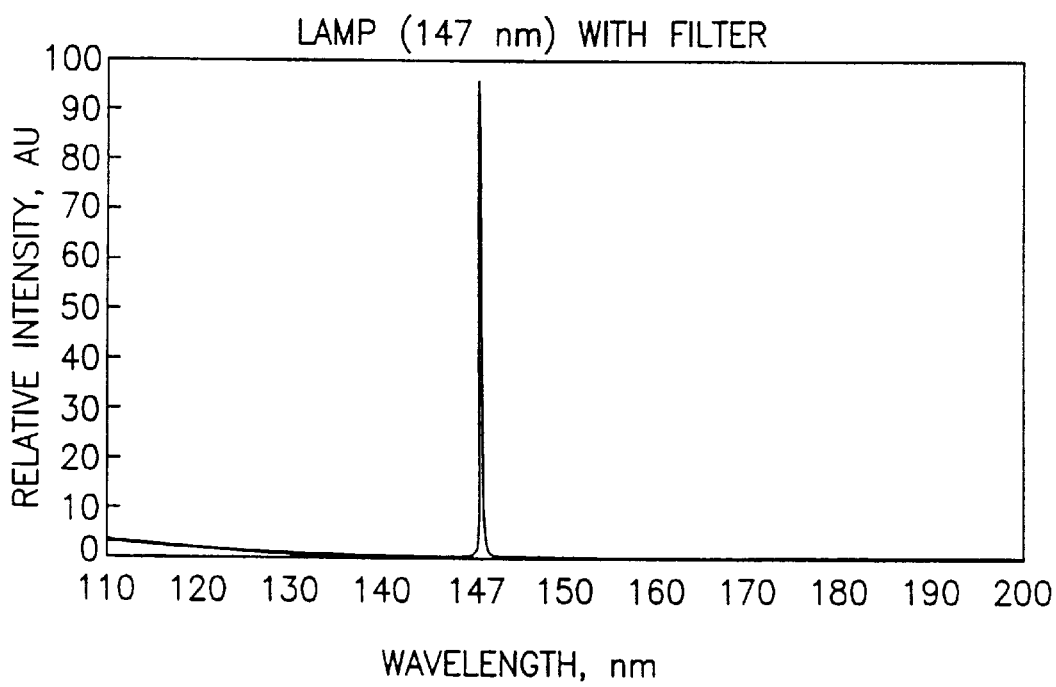
Figure 6A:
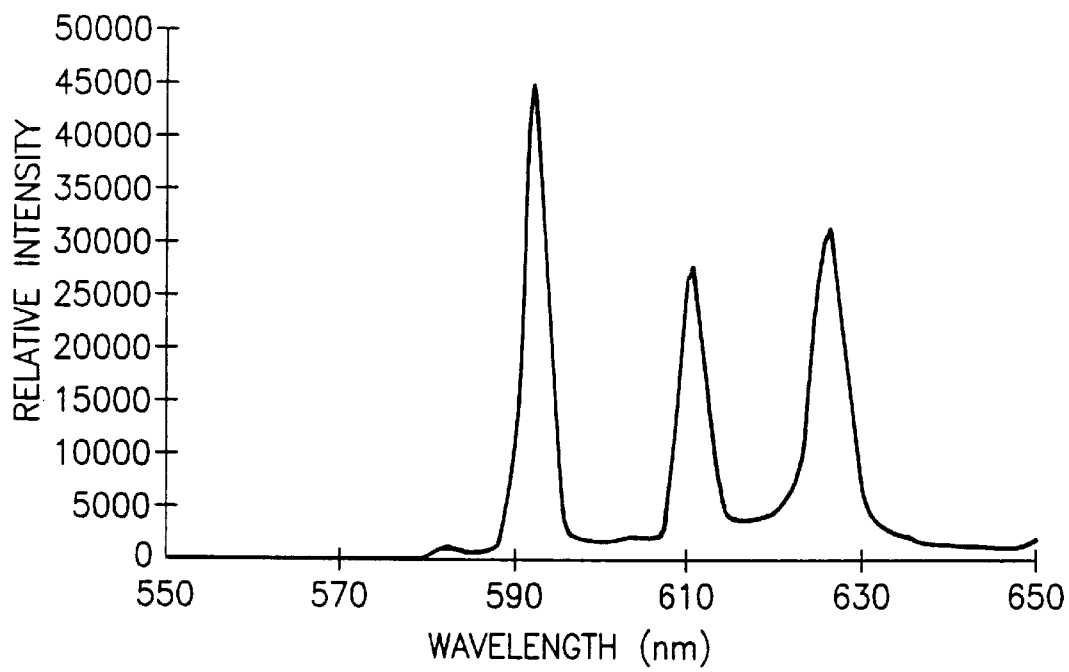
FIG. 6 shows the emission spectra of Y, Gd borate phosphors at (a) 147 nm and (b) 173 nm excitations recorded at room temperature.
Figure 6B:
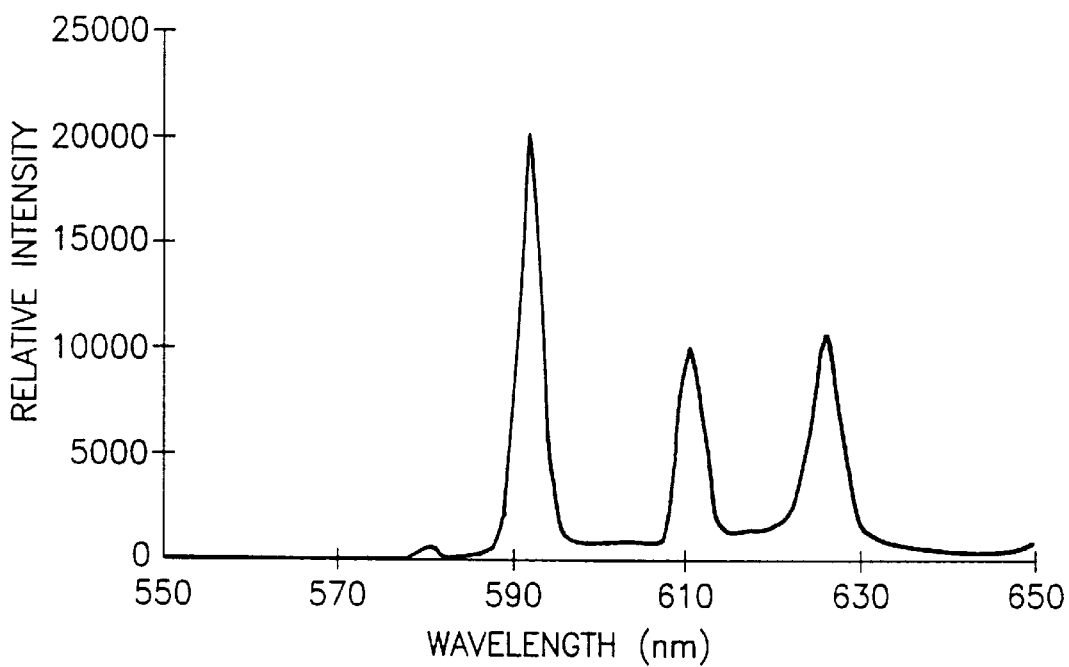

FIG. 5 represents the spectral distribution of radiation energy from different custom made Xenon lamps with a $MgF_2$ window and suitable band pass filters, which lamps provide a source of 147 and 173 nm radiation. The emission spectra of Eu activated yttrium, gadolinium borate phosphors prepared from metal nitrate are shown in FIG. 6. In general, the luminescence (emission) lines at 593,611 and 627 nm lines corresponding to $^5D_0 \rightarrow ^7F_1$ (orange red) and $^5D_0 \rightarrow ^7F_2$ (red) transitions.

The peak maximum is dependent on the Eu and Gd concentration, and the intensity of various emission lines varies. For lamp applications, all three lines at 593,611 and 627 nm are acceptable. However, with some displays, specifically TV's, it is preferable to have only red lines (611 and 627 nm). Generally, the orange line (593 nm) is minimized or eliminated by using external optical filters. The present invention relates to phosphors that enhance the intensity of red lines. The ratio of peak maximum emission spectra of red lines at 611 and 627 nm to an orange line at 593 nm line to the phosphor is greater than 0.6. The phosphors of the invention comprise from about 37 wt. % to about 48 wt. % of yttrium, from about 18 wt. % to about 9 wt. % of gadolinium, from about 4 wt. % to about 8 wt. % of europium and from about 6.6 wt. % to about 7 wt. % of boron.

Further details of this invention will be described with reference in the following examples.

EXAMPLE I

The preparation of an improved Eu activated yttrium gadolinium borate phosphor employing the hydroxides of yttrium, gadolinium and europium; and an acid catalyzer, by a sol/gel process is described in this example. The following starting materials were used in the present example. The amounts of respective hydroxide solution (semi-gels) prepared from ion exchange column and borate solutions are provided in terms of volume and percentage by weight per batch, in Table I.

TABLE I

| Chemical | Quantity (CC) | Element (Gm) | Mol. % |
|---|---|---|---|
| Yttrium Hydroxide (0.01M) | 1700 | 1.506 | 85 |
| Gadolinium Hydroxide (0.01M) | 200 | 0.314 | 10 |
| Europium Hydroxide (0.01M) | 100 | 0.148 | 5 |
| Trimethyl Borate (0.08M) | 200 | 0.173 | — |
| Boric Acid (0.65M) | 15 | — | — |

The above hydroxide solutions were mixed in a round bottom flask. Required quantities of trimethyl borate solution were added slowly to the hydroxide solution while stirring at 45° C. Boric acid was added dropwise when the solution attained the maximum required temperature (90–95° C.) and the solution was peptized at that temperature for about 9–12 hours. The water condenser column was maintained at 20° C. throughout the pepitization by use of a circulating chiller. After cooling the flask to room temperature, the solution (semi-gel) was transferred to a crystallizing dish (3L capacity) and left in an open atmosphere. After 5 to 6 days, the solution became a gel.

The transparent hard gels was dried at 45 to 50° C. for 12 hours in a lab oven. The dried product resembled a soft glass product called xerogel. The loose mass of xerogel was transferred from the glass dish and crushed in a glass mortar and pestle. A fine powder was collected into a crucible and fired in a box furnace, first at 300° C. for 2 hours (rate of heating is 2°/min.) and then at 900° C. for 6 hours, with same rate of heating. The sample was left in the furnace until it cooled down to room temperature.

A hard mass was obtained after cooling. A small quantity of water was used to pulp the hard mass into very fine particles. These fine phosphor powders were subjected to ultrasonic agitation in water. Ultrasonic treatment helps to break the clusters in to very small particles. After washing with water, these powders were dried at 100° C. for 6 hours. To recover sub-micron size particles (<0.1 micron), the phosphor solution was centrifuged. An elemental analysis of the above phosphor is shown in Table II.

TABLE II

| Element | % by wt. |
|---------|----------|
| Y | 47.92 |
| Gd | 9.97 |
| Eu | 4.81 |
| B | 6.85 |
| C | 0.03 |
| H | 0.17 |
| N | 0.00 |

EXAMPLE II

The preparation of an improved Eu activated yttrium, gadolinium borate phosphor by a solution method in accordance with the present invention, employing yttrium nitrate, gadolinium nitrate, europium nitrate and trimethyl borate; in an acid catalyzer, is described in this example. Starting materials used in the present example are listed in Table III. The amounts of starting materials, provided in grams and percentage by weight, per a batch, are shown in Table III.

TABLE III

| Chemical | Quantity (CC) | Element (Gm) | Mol. % |
|----------|---------------|--------------|--------|
| Yttrium Nitrate (0.02M) | 1500 | 2.658 | 85 |
| Gadolinium Nitrate (0.02M) | 176 | 0.554 | 10 |
| Europium Nitrate (0.02M) | 88 | 0.261 | 5 |
| Trimethyl Borate (0.08M) | 350 | 0.305 | — |
| Boric Acid (0.65M) | 27 | — | — |

The above nitrates solutions were mixed in a round bottom flask. Required quantities of methyl borate solution were added slowly to the nitrate solution while stirring at 45° C. The solution was peptized at 90° C. for about 12 hours. The remaining preparative procedure is the same as in Example I. An elemental analysis of the above phosphor is shown in Table IV:

TABLE IV

| Element | % by wt. |
|---------|----------|
| Y | 47.92 |
| Gd | 9.97 |

TABLE IV-continued

| Element | % by wt. |
|---------|----------|
| Eu | 4.83 |
| B | 6.85 |
| C | 0.00 |
| H | 0.17 |
| N | 0.00 |

The emission characteristics of these phosphors, as well as commercially available phosphors for PDP applications, were studied by exciting samples with 147 and 173 nm radiation from a suitable radiation source (Xe lamp). The results are given in Table IX. For purposes of comparison, the average particle size of each sample is also noted in the table.

EXAMPLE III

The preparation of an improved Eu activated yttrium, gadolinium borate phosphor by a solution method in accordance with the present invention, employing yttrium nitrate, gadolinium nitrate, europium nitrate, barium nitrate and trimethyl borate; in an acid catalyzer, is described in this example. Starting materials used in the present example are listed in Table V. The amount of starting materials in grams and percentage by weight per a batch, are shown in Table V.

TABLE V

| Chemical | Quantity (CC) | Element (Gm) | Mol. % |
|----------|---------------|--------------|--------|
| Yttrium Nitrate (0.02M) | 1412 | 2.500 | 80 |
| Gadolinium Nitrate (0.02M) | 176 | 0.554 | 10 |
| Europium Nitrate (0.02M) | 88 | 0.261 | 5 |
| Barium Nitrate (0.02M) | 88 | 0.241 | 5 |
| Trimethyl Borate (0.08M) | 350 | 0.305 | — |
| Boric Acid (0.65M) | 27 | — | — |

The above nitrates solutions were mixed in a round bottom flask. Required quantities of methyl borate solution were added slowly to the nitrate solution while stirring at 45° C. The solution was peptized at 90° C. for about 12 hours. The remaining preparative procedure is the same as in Example I. An elemental analysis of the above phosphor is shown in Table VI:

TABLE VI

| Element | % by wt. |
|---------|----------|
| Y | 44.42 |
| Gd | 9.82 |
| Eu | 4.74 |
| Ba | 4.28 |
| B | 6.74 |
| C | 0.00 |
| H | 0.17 |
| N | 0.00 |

The emission characteristics of these phosphors, as well as commercially available phosphors for PDP applications, were studied by exciting samples with 147 and 173 nm radiation from a suitable radiation source (Xe lamp). The results are given in Table IX. For purposes of comparison, the average particle size of each samples is also provided in the table.

EXAMPLE IV

The preparation of an improved Eu activated yttrium, gadolinium borate phosphor by a solution method in accordance with the present invention, employing yttrium nitrate, gadolinium nitrate, europium nitrate, strontium nitrate and trimethyl borate; in an acid catalyzer, is described in this example. Starting materials used in the present example are listed in Table VII. The amount of starting materials, in grams and percentage by weight per a batch, are shown in Table VI.

TABLE VII

| Chemical | Quantity (CC) | Element (Gm) | Mol. % |
|---|---|---|---|
| Yttrium Nitrate (0.02M) | 1412 | 2.500 | 80 |
| Gadolinium Nitrate (0.02M) | 176 | 0.554 | 10 |
| Europium Nitrate (0.02M) | 88 | 0.261 | 5 |
| Strontium Nitrate (0.02M) | 88 | 0.257 | 5 |
| Trimethyl Borate (0.08M) | 350 | 0.305 | — |
| Boric Acid (0.65M) | 27 | — | — |

The above nitrate solutions were mixed in a round bottom flask. Required quantities of methyl borate solution were added slowly to the nitrate solution while stirring at 45° C. The solution was peptized at 90° C. for about 12 hours. The remaining preparative procedure is the same as in Example I. An elemental analysis of the above phosphor is shown in Table VIII.

TABLE VIII

| Element | % by wt. |
|---|---|
| Y | 45.11 |
| Gd | 9.97 |
| Eu | 4.82 |
| Sr | 2.77 |
| B | 6.85 |
| C | 0.00 |
| H | 0.19 |
| N | 0.00 |

The emission characteristics of these phosphors, as well as commercial phosphor {Y,Gd,Eu(BO₃)} available from phosphor manufacturers such as Nichia, Japan; Kasei, Japan and PTL, England, were studied by exciting the samples with 147 and 173 nm radiation from a suitable radiation sources (Xe lamp). The results of the study are given in Table IX. For purposes of comparison, the average particle size of each sample is also provided in the table.

TABLE IX

| | Relative Intensity at | | | | | | |
|---|---|---|---|---|---|---|---|
| | Excitation (147 nm) | | | Excitation (173 nm) | | | Range of Particle |
| Phosphor* | 627 nm | 611 nm | 593 nm | 627 nm | 611 nm | 593 nm | Size in microns |
| Phosphor (Ex. 1) | 70.10 | 62.31 | 100.0 | 52.78 | 49.60 | 100.00 | 0.1–1.0 |
| Phosphor (Ex. 2) | 65.62 | 57.11 | 95.00 | 50.66 | 47.61 | 96.10 | 0.1–2.0 |
| Phosphor (Ex. 3) | 61.03 | 53.68 | 89.02 | 47.62 | 44.28 | 86.4 | 0.1–2.0 |
| Commercial 1 | 56.08 | 50.81 | 84.69 | 48.97 | 44.71 | 89.29 | 2.0–5.0 |
| Commercial 2 | 50.01 | 44.71 | 84.79 | 42.37 | 39.68 | 91.35 | 3.0–6.0 |
| Commercial 3 | 39.85 | 35.32 | 66.63 | 47.42 | 42.66 | 94.44 | 2.0–6.0 |

*Phosphor Ex. 1 to Ex. 3 are from the above examples, commercial 1 to 3 are commercially available phosphors for plasma displays.

As the data of Table IX demonstrates, the phosphors of Example 1 through 3, formed by sol/gel and sol/sol processes of the present invention, provide smaller particles, while also generally providing a higher level of intensity.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A method of forming a europium activated yttrium, gadolinium borate phosphor having the empirical formula:

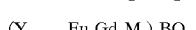

$$(Y_{1-x-y-z}Eu_xGd_yM_z) BO_3$$

wherein: $0.01 \leq x \leq 0.1$, $0 \leq y \leq 0.5$; M=Mg, Ca, Sr or Ba; and $z \leq 0.1$; said method comprising the steps of:

reacting a dilute solution comprising a source of yttrium, a source of gadolinium, a source of europium, a source of an alkaline earth metal and an organic precursor providing a source of boron in an acid medium, to form a gel; and thermally decomposing said gel at a temperature below a solid state reaction temperature to obtain said phosphor.

2. The method of claim 1, wherein said source of yttrium is selected from the group consisting of yttrium nitrate and yttrium hydroxide, said source of gadolinium is selected from the group consisting of gadolinium nitrate and gadolinium hydroxide, said source of europium is selected from the group consisting of europium nitrate and europium hydroxide, and said organic precursor providing a source of boron is trimethyl borate.

3. The method of claim 1, wherein said source of yttrium is yttrium nitrate, said source of gadolinium is gadolinium nitrate, said source of europium is europium nitrate, and said organic precursor providing a source of boron is trimethyl borate.

4. The method of claim 1, wherein said source of yttrium is yttrium hydroxide, said source of gadolinium is gadolinium hydroxide, said source of europium is europium hydroxide, and said organic precursor providing a source of boron is trimethyl borate.

5. The method of claim 1, wherein said gel is thermally decomposed in an open atmosphere, at a temperature within a range of 800° C. to 950° C.

6. The method of claim 5, wherein said gel is dried to form a xerogel and said xerogel is crushed to form a powder prior to thermal decomposition.

7. The method of claim 1, wherein said phosphor has spherical particles having an average particle size in a range from about 0.1 to about 2.0 microns.

8. The method of claim 1, a ratio of peak maximum emission spectra of red lines at 611 and 627 nm to an orange line at 593 nm line of said phosphor is greater than 0.6.

9. The method of claim 1, where said phosphor comprises from about 37 wt. % to about 48 wt. % of yttrium, from about 18 wt. % to about 9 wt. % of gadolinium, from about 4 wt. % to about 8 wt. % of europium, from 0 wt. % to about 8 wt. % of an alkaline earth (Ba,Sr,Ca or Mg) and from about 6.6 wt. % to about 7 wt. % of boron.

10. The method of claim 1, wherein said source of alkaline earth metal is selected from the group consisting of alkaline earth metal nitrates and alkaline earth metal hydroxides.

11. A europium activated yttrium, gadolinium borate phosphor having the empirical formula:

$$(Y_{1-x-y-z}Eu_xGd_yM_z)\ BO_3$$

wherein: $0.01 \leq x \leq 0.1$, $0 \leq y \leq 0.5$; M=Mg, Ca, Sr or Ba; and $z \leq 0.1$; formed by a process comprising the steps of:

reacting a dilute solution comprising a source of yttrium, a source of gadolinium, a source of europium, a source of an alkaline earth metal and an organic precursor providing a source of boron in an acid medium, to form a reaction solution;

forming a fine powder by subjecting said reaction solution to evaporation; and thermally decomposing said fine powder at a temperature below a solid state reaction temperature to obtain said phosphor.

12. The phosphor of claim 11, wherein said source of yttrium is selected from the group consisting of yttrium nitrate and yttrium hydroxide, said source of gadolinium is selected from the group consisting of gadolinium nitrate and gadolinium hydroxide, said source of europium is selected from the group consisting of europium nitrate and europium hydroxide, and said organic precursor providing a source of boron is trimethyl borate.

13. The phosphor of claim 11, wherein said source of yttrium is yttrium nitrate, said source of gadolinium is gadolinium nitrate, said source of europium is europium nitrate, and said organic precursor providing a source of boron is trimethyl borate.

14. The phosphor of claim 11, wherein said source of yttrium is yttrium hydroxide, said source of gadolinium is gadolinium hydroxide, said source of europium is europium hydroxide, and said organic precursor providing a source of boron is trimethyl borate.

15. The phosphor of claim 11, wherein said gel is thermally decomposed in an open atmosphere, at a temperature within a range of 800° C. to 950° C.

16. The phosphor of claim 15, wherein said gel is dried to form a xerogel and said xerogel is crushed to form a powder prior to thermal decomposition.

17. The phosphor of claim 16, wherein said phosphor has spherical particles having an average particle size in a range from about 0.1 to about 2.0 microns.

18. The phosphor of claim 11, wherein a ratio of intensity of emission spectra of red lines at 611 and 627 nm to an orange line at 593 nm line of said phosphor is greater than 0.6.

19. The phosphor of claim 11, comprising from about 37 wt. % to about 48 wt. % of yttrium, from about 18 wt. % to about 9 wt. % of gadolinium, from about 4 wt. % to about 8 wt. % of europium, from 0 wt. % to about 8 wt. % of an alkaline earth (Ba,Sr,Ca or Mg) and from about 6.6 wt. % to about 7 wt. % of boron.

20. The phosphor of claim 11, wherein said source of alkaline earth metal is selected from the group consisting of alkaline earth metal nitrates and alkaline earth metal hydroxides.

* * * * *